April 13, 1926.

E. E. PEARCE 1,581,088

METHOD OF THAWING GROUND

Filed March 26, 1921

Inventor
Edward E. Pearce
By Brown, Boettcher & Kiemer
Attorneys

April 13, 1926.
E. E. PEARCE
METHOD OF THAWING GROUND
Filed March 26, 1921     2 Sheets-Sheet 2
1,581,088
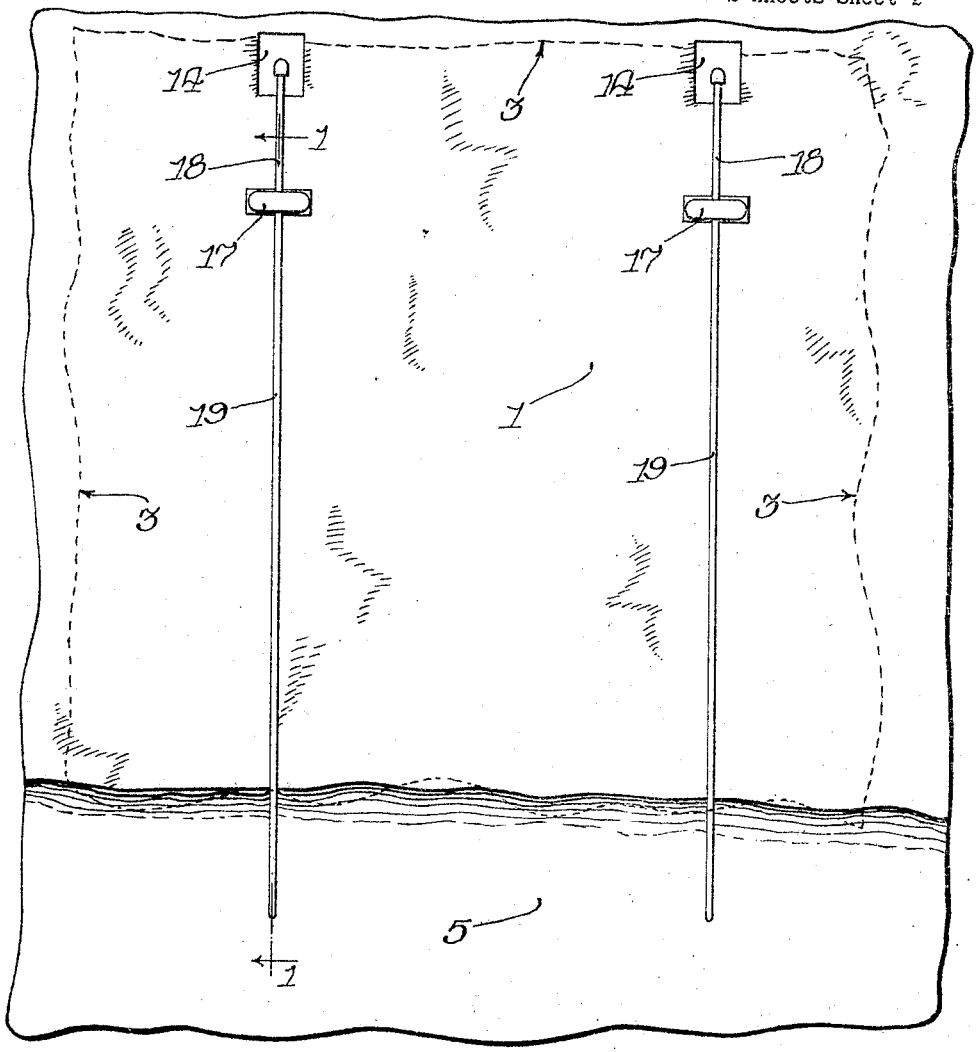
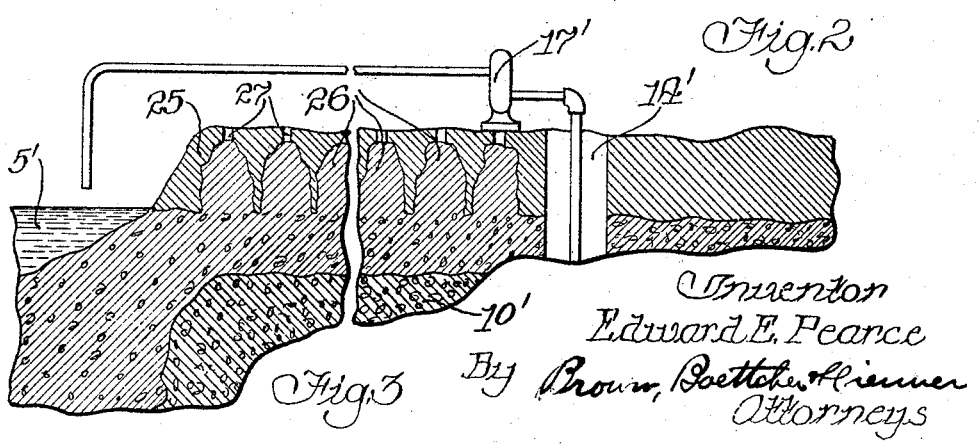
Inventor
Edward E. Pearce
By Brown, Boettcher & Kiemer
Attorneys Patented Apr. 13, 1926.

1,581,088

UNITED STATES PATENT OFFICE.

EDWARD E. PEARCE, OF CANDLE, TERRITORY OF ALASKA, ASSIGNOR OF ONE-THIRD TO ROBERT R. CENEK, OF GARY, INDIANA.

METHOD OF THAWING GROUND.

Application filed March 26, 1921. Serial No. 456,002.

*To all whom it may concern:*

Be it known that I, EDWARD E. PEARCE, a citizen of the United States, residing at Candle, in the Territory of Alaska, have invented a certain new and useful Improvement in Methods of Thawing Ground, of which the following is a full, clear, concise, and exact description, reference being had to the accompanying drawings, forming a part of this specification.

My invention relates to a method of thawing ground.

More especially, my invention relates to a method of thawing mineral bearing ground to facilitate the exploitation thereof, although, of course, I do not intend to limit the invention to such a particular use or purpose only. Taking a particular example, it is well known that in the Northern gold regions, particularly in the Klondyke districts of Alaska and the Yukon, successful exploitation of the gold-bearing areas has heretofore been impossible, due to the permanent ground frost encountered in most of these regions usually up to within a foot or two from the surface. The cost of dredging frozen ground by thawing ahead of the dredge with steam points is prohibitive of the exploitation of the average gold bearing gravels. In addition to its prohibitive cost, steam thawing has not been satisfactory. The steam, upon being fed into the ground, radiates irregularly therethrough, frequently forming irregular boulders or masses of frozen ground, which not only hinder proper dredging, but do not yield sufficient mineral to warrant the additional cost of extraction; nor has profitable extraction of the gold by attacking the frozen ground without any attempt to thaw the same been attained. Up to the present time dredge operators have usually avoided the frozen portions of the ground, with the result that vast areas which would furnish excellent dredging ground if they were not frozen, are not being worked.

My invention seeks a simple, inexpensive, expedient, and effective method of thawing, and consistently aims to make much more mineral bearing ground available for highly profitable exploitation than has been available heretofore in the art.

It is well known that where a body of water extends over the ground, the area immediately below the body of water is gradually saturated and thawed. Further observation will show that water from such body will gradually percolate through the ground above the frost line hereinbefore referred to, forming a seepage stratum or vein therethrough. Heretofore, the depth of this seepage stratum has been limited by the frost line.

According to the theory of my invention, I provide for increasing the flow or percolation of the seepage water over the mineral bearing or pay ground. As the flow of the main body of water causes thawing of the ground immediately below, this increased flow or percolation of seepage water will gradually lower the thaw line, with an accompanying gradual thawing of the frozen area therebeneath. There is no irregular radiation through the ground to cause the formation of irregular boulders or masses of frozen ground, as in thawing by steam, but a gradual lowering of the frost line is effected to completely saturate and thaw the frozen area. In what I now consider to be the preferred embodiment of my invention, a suitable shaft, or a number of shafts, as the case may warrant, are sunk, and a flow or percolation of seepage water from the body of water extending over the ground to the shaft is set up over the area to be thawed. Pumps, or other suitable means, are preferably provided for conveying the water from the shaft either back to the main body of water, or otherwise disposing of it as desired.

In order that those skilled in the art may be fully acquainted with the nature and scope of my invention, I shall now describe a specific embodiment of the invention in connection with the accompanying drawings, in which:

Figure 2 is a plan view of the same, showing the mineral bearing or pay streak in dotted lines; and, Figure 3 is a fragmentary cross-sectional view similar to Figure 1, showing my invention in connection with another condition of ground frequently encountered.

Figure 1:
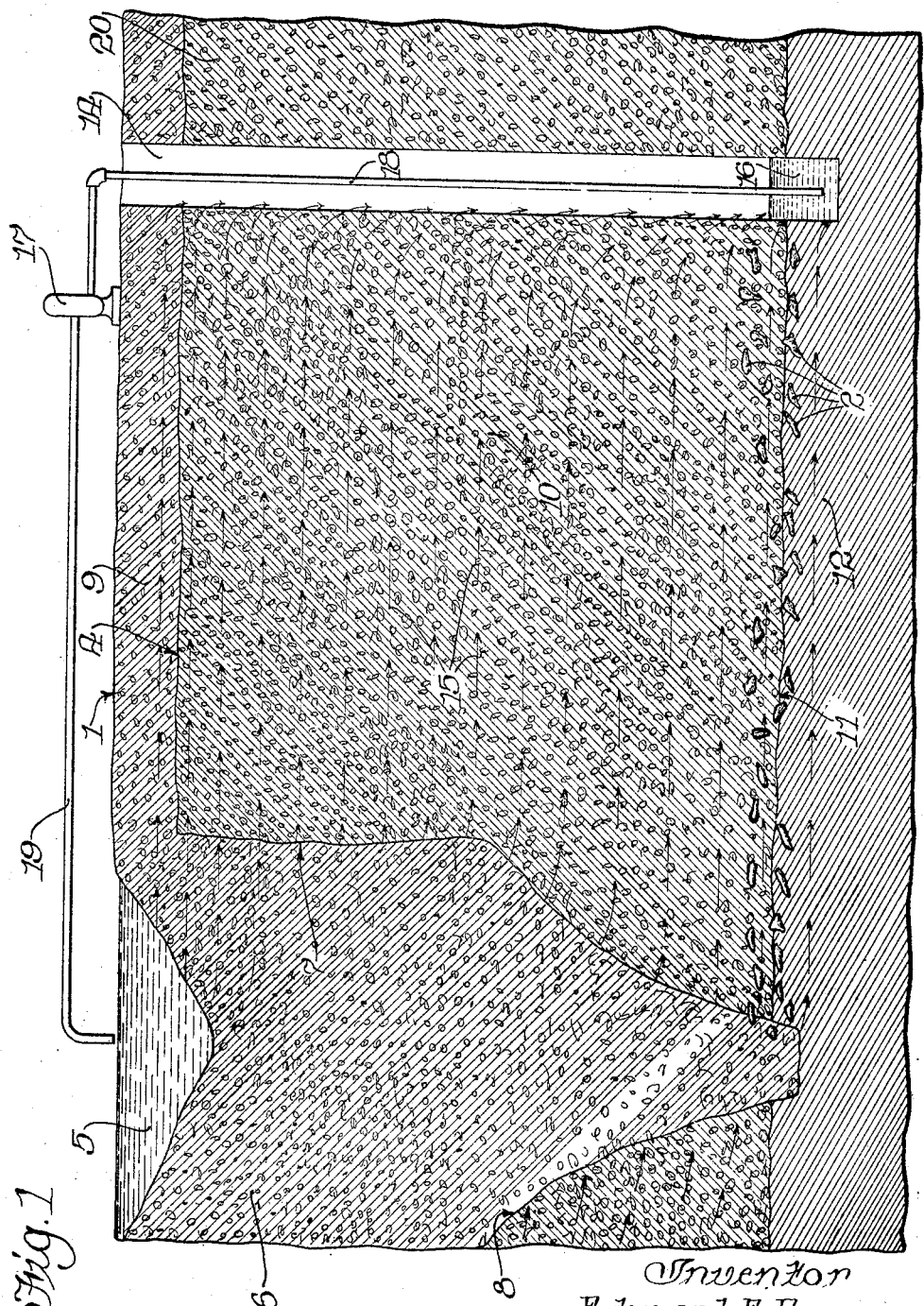
Figure 1 is a diagrammatic cross-sectional view taken substantially on the line 1—1 of Figure 2 of an area of ground showing a body of water extending thereover, a frozen area therebeneath, one means for thawing the frozen area in accordance with my invention.

I shall now describe by reference to the accompanying drawings the fundamental action of my invention in the thawing of ground bearing gold or other minerals to facilitate the exploitation thereof.

Referring to the drawings 1 designates the surface of a plot of ground having a stratum of gold for example, beneath its surface as shown more or less diagrammatically at 2 in Figure 1, the extent of this particular streak being outlined in Figure 2 by the dotted lines 3. It is well known and has already been set out that in the Northern gold regions for example through the Klondyke districts of Alaska and the Yukon a successful exploitation of gold strata such as shown at 2 has been impossible due to the permanent ground frost encountered in most of these regions up to within a few feet of the surface 1, for example, up to the frost line 4. It is also well known that where a body of water such as shown at 5 extends across the surface 1 of the ground, the area immediately below the body of water is gradually saturated and thawed. The thawed area usually assumes an irregular formation such as the area 6 bounded by the lines 7 and 8 in Figure 1.

Water from the body 5 gradually percolates or seeps through the ground 9 above the frost line 4 forming a seepage stratum therethrough. That portion of ground 9 above the frost line 4 is thawed at certain seasons by the combined agencies of sun and water, while the area 10 bounded on its left by the line 7 is continuously or permanently in a frozen condition. The greatest concentration of gold is usually found along the line 11 between the frozen area 10 and the bed rock stratum 12. While the depths to bed rock are usually moderate, the cost of dredging or excavating through the frozen area 10 between the surface 1 and the mineral stratum 2 has heretofore been prohibitive of the exploitation of the average mineral bearing areas. Although in the gold regions, the areas 6, 9 and 10 are usually composed of gravel, the composition of such areas is immaterial in so far as my invention is concerned. Heretofore in the art the depth of the seepage stratum has been limited downwardly by the frost line 4.

The fundamental action of my invention is had in the particular instance shown by sinking a shaft 14 or a number of such shafts according to the dimensions of the area to be thawed, at such points that the area to be thawed will be positioned between the shaft 14 and the thawed area 6 immediately below the bottom of the body of water 5 extending across the surface 1 of the ground. The flow of percolation of seepage water along the frost line 4 and through the ground 9 thereabove is immediately increased from the body of water 5 and thawed area 6 therebelow to the shaft 14. In other words, the inertia of this seepage water is decreased, or the fluidity of such water is increased. I find that in the same manner that the flow of the main body of water 5 causes thawing of the ground immediately therebelow, this increased flow or percolation of seepage water gradually lowers the frost line 4 and line of seepage as shown by the arrow lines 15 in Figure 1 with an accompanying gradual thawing of the frozen area 10 therebeneath. As already set out, there is no irregular radiation through the ground to cause the formation of irregular boulders or masses of frozen material as in thawing by steam, but by increasing the fluidity of the seepage water along the frost line 4 and thereabove, the frost line is gradually moved downwardly through the frozen area to gradually saturate and thaw the same from the top to the bottom thereof.

When the seepage stratum has been lowered through the entire frozen area to completely thaw the same, such area may be easily dredged or excavated to reach the gold bearing stratum 2. Large volumes of mineral bearing ground heretofore not available are by my invention made available for highly profitable exploitation. My invention provides for a more even and more effective thawing of the ground at considerably less cost than possible with the steam and other thawing arrangements of the prior art not more than one-tenth of the cost of steam thawing and under many conditions, much less than that. The gold 2 may be removed from the gold bearing ground in any desired manner. Such removal forms no part of my present invention.

The increased seepage, flow, or percolation of water from the body of water 5 will gradually build up a level in the shaft 14 as shown at 16. This water 16 is preferably removed by a suitable pump 17 having an intake line 18 extending downwardly thereinto, and an exhaust pipe 19 exhausting the water in the particular instance shown back into the body of water 5. The water in the shaft 14 may be disposed of in any other desired manner. Under certain conditions, such disposal may not even be desirable. The exhaust line 19 may be arranged to exhaust the water from the shaft 14 to create a body of water to the right (Fig. 1) of the shaft from which seepage back to the shaft would thaw the frozen area 20 to the right of the shaft 14 should it be desired to get through such area to a gold bearing stratum therebeneath.

Frequently, deposits of muck and the like are found over the ground as shown at 25 in Fig. 3. By providing relatively small openings vertically through the layer of muck as shown at 27, a flow or seepage from the body of water 5′ to the shaft 14′ is set up in accordance with my invention, thereby not only thawing the frozen area 10' but gradually thawing the layer of muck 25 as shown at 26 so that it may be readily caved in or penetrated.

While I have described my invention in connection with the exploitation of mineral bearing areas, it is not limited to such purpose, but the fundamental action is adapted for various other purposes. As already stated, the particular manner of disposing of the water from the shafts 14 is immaterial. The body of water 5 may be a natural one or it may be artificially created.

The feature of moving the thaw line gradually downwardly through the frozen area is a highly important aspect of my invention.

I claim:

1. The method of thawing a frozen area of ground having an unfrozen area overlying the same which comprises sinking a shaft thereinto to increase the seepage of water through the unfrozen area from an adjacent body of water and thereby gradually thaw downwardly through the frozen area with a resulting gradual movement of the frost line between the frozen and unfrozen areas down through the frozen area.

2. The method of thawing a frozen area of ground having an unfrozen area overlying same which comprises sinking a shaft thereinto to increase the seepage of water through the unfrozen area with a resulting gradual movement of the frost line between the frozen and unfrozen areas down through the frozen area and removing the water from said shaft.

3. The method of thawing a frozen area of ground having an adjacent unfrozen area through which seepage water from an adjacent body of water percolates which comprises sinking a shaft thereinto to artificially increase the water seepage through the unfrozen area with a resulting movement of the frost line between the frozen and unfrozen areas through the frozen area and exhausting the water from said shaft back to said adjacent body of water.

4. The method of thawing a frozen area of ground having a seepage stratum overlying same with a frost line between the top of the frozen area and said seepage stratum which comprises forming an opening therein for increasing the seepage through said overlying seepage stratum and moving the frost line between said stratum and the frozen area downwardly through the frozen area from the top.

In witness whereof, I hereunto subscribe my name this 18th day of March, A. D., 1921.

EDWARD E. PEARCE.